Patented Mar. 7, 1939

2,149,759

UNITED STATES PATENT OFFICE 2,149,759

MANUFACTURE OF PHENOL-OLEFIN REACTION PRODUCTS USEFUL AS GASOLINE GUM INHIBITORS

Troy Lee Cantrell, Lansdowne, Pa., assignor to Gulf Oil Corporation, Pittsburgh, Pa., a corporation of Pennsylvania No Drawing. Application September 4, 1936, Serial No. 99,488

5 Claims. (Cl. 260—624)

This invention relates to improvements in the manufacture of inhibitors and more particularly to the manufacture of gum inhibitors for addition to motor fuels and the like, and it comprises an improved method of manufacturing inhibitors wherein a phenol or mixture of phenols is mixed with ten per cent or less by weight of concentrated sulfuric acid, olefins in the gaseous or vaporous state, for example, olefin-containing gases, are passed into intimate cotact with the mixture at temperatures varying between 60° and 225° F., until the reaction mixture shows a substantial gain in weight, the crude reaction product is washed with dilute aqueous alkali solution and the alkali-insoluble portion recovered; all as more fully hereinafter set forth and as claimed.

This application is in part a continuation of my prior copending application, Serial No. 64,413, filed February 17, 1936.

Cracked petroleum distillates, such as the cracked motor fuels now manufactured in large quantities, when untreated, contain relatively unstable constituents and are characterized by a tendency to deposit undesirable gummy or resinous materials upon standing, this tendency being particularly noticeable under the influence of light and air. Gum formation in motor fuels is also undesirable in that it is usually attended with a lowering in anti-knock rating and development of a yellow or brown color.

Recently, it has been found that small quantities of certain materials when added to cracked motor fuels inhibit the formation of gums. The best of these materials are those which also inhibit undesirable color formation and do not reduce the anti-knock value of the fuel to which they are added.

Among the most effective inhibitors known are those which have been previously manufactured by treating an olefin-containing liquid with a mixture of a phenol and sulfuric acid, the reaction mixture being freed of sludge, washed with an aqueous caustic solution and subjected to fractional distillation, the still residue being recovered and used as an inhibitor as such or further concentrated by distillation or by extraction with solvents. As an example of such a method, inhibitors have been previously manufactured by treating a cracked petroleum naphtha in the liquid phase with a mixture of a phenol and sulfuric acid, the reaction mixture being freed of sludge, washed with aqueous caustic solution and a gasoline fraction distilled off, and the still residue being recovered and used as an inhibitor as such or further concentrated by distillation or extraction with solvents.

While the inhibitors recovered by the above method are highly desirable, the method itself is susceptible to improvement because of the large proportion of sulfuric acid required per unit volume of phenol, the necessity of treating large amounts of liquid to recover small amounts of inhibitor, the relatively poor economy of phenol and acid in the process and the necessity of distillation to recover inhibitor with the consequent thermal requirements adding to the expense of manufacture.

The present invention comprises an improved method of manufacturing inhibitors. Among the objects attained by my invention are economy of sulfuric acid and phenol and elimination of costly distillation steps in the recovery of concentrated and potent inhibitors.

According to my invention, the operation is so conducted as to avoid the presence of liquid hydrocarbon at any time during the reaction, at least to such extent as would cause the precipitation of sulfuric acid out of solution in the phenol, or to such extent as would result in undesirable dilution of the final anti-oxidant. Thus, I prefer not to operate with mixtures of olefins differing widely in reactivity, or with mixtures of olefinic and non-olefinic materials containing less than say 60.0 per cent by weight of olefins, in the liquid phase. I may employ pure or highly concentrated olefins, for example amylene, in the liquid phase; in such case it is important to so limit the rate of addition of the olefin to the phenol-acid mixture as not to be in substantial excess of the rate of reaction. In this way, not only is precipitation of the acid by excess liquid avoided, but the product is concentrated, also; it is substantially entirely composed of anti-oxidant.

The rate at which the reaction mixture will absorb olefins and gain in weight and volume increases with increasing temperature and with increasing concentration of olefinic material present in the gases or vapors introduced; moreover certain phenols and certain olefins, respectively, react more quickly than others.

I prefer, however, to introduce olefinic material in the vapor or gaseous phase; in such case, any material which is not absorbed in the reactive acid-phenol liquid simply passes overhead and does not act to preciptate acid or dilute the product, provided, of course, that the temperatures are such as to prevent mechanical condensation of unreacted hydrocarbon. If the olefin be comparatively pure, as for example when using substantially pure amylene vapor, the rate of reaction will determine the rate of addition. Economy in the use of such relatively expensive material may result from recycling the unreacted portion of the vapor, or by passing the vapors through a plurality of acid-phenol baths in series.

Using refinery gases containing olefins, and other mixtures of olefinic and non-olefinic constituents, the rate of addition is somewhat less important; nevertheless, it may in some instances be desirable to limit the rate of addition to a point not substantially in excess of the rate of reaction.

Normally liquid olefins and hydrocarbon mixtures containing olefins may be treated in accordance with my invention, provided they are capable of being brought into the vapor phase at a temperature lower than the reaction temperature desired; the latter, as aforesaid, may be as high as 250° F. Vaporization of the olefin may be assisted, where desired, by operating under a vacuum; this also helps to prevent accumulation of excess liquid hydrocarbon.

I have found that when 10 per cent or less by weight of 60 to 100 per cent sulfuric acid, or even a fuming sulfuric acid, is added to a phenol such, for example, as phenol ($C_6H_5OH$) itself, certain xylenols, cresols, or commercial "cresylic acid," and gaseous olefins, or gases or vapors containing olefins, are passed at temperatures from 60° to 250° F. into the mixture in suitable absorption apparatus, the liquid reaction mixture will gain in weight and volume for a certain period, after which no further appreciable gain in weight is noticeable.

The amount of absorption of olefin into the phenol, and the consequent gain in weight and volume of the latter, will of course vary considerably with the natures of the olefins and phenols used. Ordinarily, I prefer to continue the addition of olefin until no further gain in weight or volume of the phenol is observed, and I have made products which at the final stage (prior to washing with caustic soda solution) represent an increase of as much as 250 per cent over the volume of the original phenol. However, I may limit the extent of absorption and reaction to a point short of completion, in order to obtain products useful for special purposes. In such event, I may stop adding olefin when the acid-phenol mixture has gained as little as, say, 50 per cent in volume, or at any point between this figure and the maximum figure obtainable. For example, I may continue the introduction of olefin until the final product represents a gain in volume of from 100 to 150 per cent of the original phenol. I prefer always to carry the absorption and reaction to such extent that none of the original phenol is left entirely unreacted upon; usually all of the phenol present has entered into the reaction to some extent by the time the gain in volume has reached 30 to 40 per cent of the original phenol.

The reaction product of my process is usually liquid, oily material, although solids are sometimes present when the phenolic material employed is largely phenol itself, when the olefins used are carefully selected, for example when isobutylene is used, and when the operation is conducted until a maximum degree of absorption of olefin is approached. When the mixture is washed with a dilute aqueous solution of alkali, say a 10 per cent solution of sodium hydroxide, if the alkali-insoluble material is separated and recovered, it will be observed to be a product ranging in consistency from a high-boiling, oily, viscous liquid to a solid crystalline mass. Some of the products within this range are in the form of a magma or mush of crystals in oily liquid. The liquid reaction products range in color between pale yellow and mahogany, and range in boiling point between 400° and 700° F. at atmospheric pressure. The crystalline masses sometimes produced are of a color ranging between a dirty white and mahogany and these crystals are found to liquefy at elevated temperatures, the resultant liquids boiling between 400° and 700° F. The reaction products are all excellent inhibitors with characteristics adapting them for addition to cracked gasolines to inhibit gum formation.

Depending upon variations in the choice of phenol or phenols employed in the method of my invention, variations in operating conditions, etc., the inhibitors produced by my methods will vary in inhibiting powers, but all of the products which I have so made have been sufficiently powerful to adequately stabilize highly cracked gasoline when added thereto in amount of 0.05 per cent or less by weight. By "adequately stabilize" I mean increase the induction period of gasoline under a standard accelerated oxygen stability test from, say, 2 hours to between 5 and 8 hours. And the most potent of my inhibitors will sometimes increase the induction period of a gasoline to 12 hours or more.

The physical properties of the preferred antioxidants or inhibitors produced by my process will vary over the following ranges:

| | |
|---|---|
| Gravity: °A. P. I | 7.9–30.0 |
| Specific gravity: 60°/60° F | 1.015–0.87 |
| Viscosity, S. U. V. at 100° F. (seconds) | 75–(solid) |
| Pour: (liquid only) °F | 0–30 |
| Melting point: (solids only) °F | 70–250 |

The finished products are completely soluble in and miscible with hydrocarbon oil, and do not precipitate from the oil upon standing. They are insoluble in water and insoluble or only slightly soluble in dilute caustic soda solutions. They react to some extent with concentrated caustic soda solutions, for example 50 per cent solutions, to form sodium salts.

On distillation with steam, the major portion of both solid and liquid inhibitors will distill over between 450° F. and 550° F. Their high boiling-point range makes them desirable, as they are not lost by volatilization when added to gasoline. They are all sufficiently soluble in gasoline to render them stable against separation. In addition, these inhibitors are entirely insoluble in water and hence are not removed from gasoline on contact with water.

The following examples are typical specific embodiments of my invention, illustrating advantageous ways of conducting my improved method:

*Example I*

100 parts by weight of phenol were placed in a suitable absorption vessel having a gas inlet below the liquid level and a gas outlet at the top. Advantageously, the gas inlet is arranged to introduce gas into the liquid in a finely divided state to cause agitation and efficient contact. One part by weight of 94.5 per cent sulfuric acid was gradually added to the phenol while agitating. The acid was taken up by the phenol and formed one phase. There was then introduced through the gas inlet a refinery gas having the following approximate composition by volume:

| | |
|---|---|
| Hydrogen and methane | 15.1% |
| Ethane and ethylene | 28.5% |
| Propane and propylene | 36.4% |
| Butane and butylene | 18.6% |
| Pentanes | 1.4% |
| | 100.0% |
| Total unsaturates | 17.5% |
| Specific gravity | 1.20 |

In this example, the gas was introduced at the rate of 4 cu. ft. per hour for every pound of phenol. In this instance, the temperature of the reaction was not controlled and varied from 100° to 185° F. The gas was continuously introduced until the reaction mass had gained in weight about 150 per cent, after which the flow of gas was stopped. The reaction mass was withdrawn and purified by washing with water to remove water-soluble material, after which it was again washed with a 10 per cent solution of caustic soda or potash. The aqueous and dilute caustic washes usually remove about 5 to 10 per cent of the crude oily material, leaving an insoluble portion which is a yellow viscous oil of about 0.904–0.915 specific gravity. This material, when added in the proportion of 0.02% to a cracked gasoline having an induction period of 2 hours, increased the induction period of the gasoline to 6 hours without lowering its anti-knock value. The inhibited gasoline showed better stability against deterioration in color than when uninhibited.

*Example II*

To 100 parts by weight of phenol, 1 part of 96 per cent sulfuric acid was slowly added with agitation until the acid went into solution. This mixture was charged into a reaction vessel similar to that previously described, but having means for heating the reactments, such as a steam coil or heating jacket. The mixture of phenol and acid was brought to a temperature of about 212° F. A mixture of light hydrocarbons produced in cracking naphtha and having the approximate composition given below was first heated to 212° F. to insure vaporization of all the constituents and the gases were then introduced into the mixture of phenol and acid at a rate corresponding to about 5 cu. ft. per hour for every gram-molecular weight of phenol.

*Approximate analysis of gas introduced*

| | Per cent |
|---|---|
| $H_2$ and $CH_4$ | 0.5 |
| $C_2H_4$ and $C_2H_6$ | 0.9 |
| $C_3H_6$ and $C_3H_8$ | 29.4 |
| Isobutane and isobutene | 14.1 |
| Normal butane and butenes | 35.4 |
| Isopentane-isoamylene | 0.8 |
| Normal pentanes and amylenes | 8.6 |
| Higher homologues | 10.3 |
| Total unsaturates | 34.1 |

The reaction proceeded rapidly and absorption of olefins from the gas continued until the reaction mixture had gained approximately 200 per cent in weight, after which no further gain in weight was manifest. The supply of gas was then cut off and the hot reaction products were withdrawn from the reaction vessel. With the particular reactants here employed, the reaction product is a magma of fine red crystals in a reddish liquid. This magma was washed with water to remove water-soluble material and then with a 10 per cent aqueous solution of alkali as in the previous example. The water and alkali washes removed about 8 to 10 per cent of the crude reaction product, leaving a magma of insoluble material.

In inhibiting oxidation of gasoline, I use this magma as such, as it is entirely miscible with gasoline, at least so far as regards proportions in which it would be likely to be used; ordinarily, inhibitors would not be added to gasoline in proportions larger than one or two per cent, and usually the proportion would be far below one per cent, for example 0.0005 to 0.10 per cent. Added to a cracked gasoline previously having an induction period of 2 hours, the addition of 0.01% by wt. of inhibitor increases the induction period of the gasoline to 6 hours without lowering its anti-knock value or impairing its color.

*Example III*

100 parts by weight of ortho-cresol were mixed with 2 parts of 94.5 per cent sulfuric acid in apparatus similar to that described in Example I above, and a refinery gas of the same constituency as that used in Example I was passed into the mixture under similar conditions at such a rate as to cause the reaction mixture to increase in weight at a rate of about 1 per cent per hour and in volume somewhat over 1 per cent per hour. The reaction was continued until the mixture showed a gain in weight of about 95 per cent. The temperature of the reaction was not controlled, and varied but slightly from room temperature. After no further gain in weight was manifest, the supply of gas was cut off and the reaction mass was withdrawn and purified in the same manner as described in connection with Example I, yielding ultimately a portion insoluble in a 10 per cent solution of caustic soda. The insoluble portion is a reddish viscous oil of specific gravity about 0.910 to 0.95. When added to a cracked gasoline having an induction period of 2 hours, 0.01% of this inhibitor increased the induction period of the gasoline to 6.5 hours without lowering its anti-knock value or impairing its color. From the 100 parts by weight of ortho-cresol taking part in the reaction, 180 parts by weight of the purified inhibitor were produced.

*Example IV*

To 50 gallons of crude cresylic acid (a mixture of phenol, the three cresols, certain xylenols, and the like), 0.25 gallon of 98 per cent sulfuric acid was added in absorption apparatus similar to that described in the foregoing examples, and to this mixture refinery gas was introduced at an initial temperature of 120° F. in the manner before described. The reaction mixture had gained about 190% in volume at the end of 23 hours. The temperature rose to 150° F. in the early stages and was maintained at that point thereafter.

The crude reaction product was purified as before by washing with 10 per cent aqueous caustic soda solution in amount theoretically required to neutralize the acidity of the reaction product. Ten per cent of the crude reaction product was removed by the alkaline wash, leaving a slightly viscous oil having the following properties:

Gravity, °A. P. I. _____ 21.3
Specific gravity: (60°/60° F.) _____ 0.9260
Viscosity (S. U. V., 100° F.) (seconds) __ 176
Color (Saybolt) _____ 8
Pour point, °F. _____ 0

From 50 gallons of crude cresylic acid introduced into the reaction, 130 gallons of purified inhibitor was obtained. 0.01% by weight of this inhibitor, added to a gasoline having an induction period of 2 hours, increased the induction period to 6 hours without lowering the anti-knock value. The gasoline so inhibited shows better stability against deterioration in color than when uninhibited.

Example V 50 gal. of "90% phenol" was mixed with 20 lb. of 98% "black acid", the latter being a recovered acid obtained from acid sludge produced in washing hydrocarbon oil with sulfuric acid. The 90% phenol employed had the following properties:

Specific gravity: 60°/60° F. _____ 1.050
Melting point, capillary tube: °F. _____ 91.9
Color: N. P. A. _____ 5

The phenol was placed in a suitable iron vessel and heated to a temperature of 120° F. Olefinic gas was then introduced slowly to agitate the phenol and the acid was added in two batches, 10 lb. at first and the remaining 10 lb. two hours later. The temperature at the end of two hours was 150° F. and the mixture was maintained at this temperature for 16 hours, olefinic gas being passed through the mixture during this time at the rate of 1600 cu. ft. per hour. The operation was conducted under a pressure of from 15 to 25 lb. per sq. in.

The olefinic gas employed in this example was a cracked hydrocarbon gas fraction, obtained in the pyrolysis of hydrocarbon oil, and having a specific gravity of 1.785. Upon agitation of a sample of this gas with 64% $H_2SO_4$, the acid absorbed 12.5 per cent by volume of the gas, which may be considered as isobutylene and dienes. The remainder of the sample lost 20.0 per cent by volume (based on the original volume of gas) by absorption in 87 per cent acid, which may be considered as propylenes, butylenes, and similar constituents. The remainder of the sample, upon being washed with bromine water, following the two acid washes, lost 2.6 per cent by volume (based on the original volume of gas), which may be considered as ethylene. The gas therefore contained 34.1 per cent by volume of unsaturated constituents.

Upon completion of the operation, there was produced a material representing 300 per cent by volume of the original phenol, i. e., 150 gallons.

The crude product was then raised to from 200° to 212° F., and 20 gallons of 10 percent caustic soda solution were added to neutralize the sulfuric acid present. The resultant product, after removal of the caustic layer, was washed with boiling water, live steam being introduced during the washing operation, and was then allowed to settle for two hours after which the aqueous layer was withdrawn. The remaining material was blown with air for two hours in order to reduce the moisture content of the product to 2 per cent by weight.

The final product, produced as set forth hereinabove, had a volume of 135 gal. and comprised a mixture of about 90 per cent of an oil-soluble material having anti-oxidant properties, and about 10% of what appear to be gasoline-like polymers. It is a highly satisfactory anti-oxidant and gum inhibitor. The physical properties of this product were as follows:

Gravity, °A. P. I. _____ 21.6
Viscosity (S. U. V., 100° F.) _____ 122
Color (N. P. A.) _____ Dark
Pour point, (°F.) _____ 0

Wherever the hydrocarbon is supplied in the gaseous or vapor phase to the acid-phenol mixture, it is of course desirable that the latter be liquid. Commercial phenol ($C_6H_5OH$), commercial ortho-cresol, and some other phenols are solids at ordinary room temperature when dry, and may remain dry upon the addition of five per cent or more of sulfuric acid; such mixtures are, however, readily liquefied by warming them, and in all cases may be warmed to and held at a liquefying temperature for contact with the gaseous or vaporous olefinic material.

The amount of sulfuric acid employed in my method may vary between 1 and 10 per cent by weight of the phenol employed without detrimental effect upon the result. However, when amounts of sulfuric acid appreciably larger than those stated are employed, there is less production of inhibitor and a greater tendency toward formation of hydrocarbon polymers. The use of dilute acid also tends to lessen the yield of inhibitor. Temperatures much lower than those stated increase the time necessary to complete the reaction.

My invention is not intended to be limited by the specific examples described, but may variously be practiced and embodied within the scope of the claims hereinafter made.

What I claim is:

1. The process of manufacturing concentrated phenol-olefin reaction products useful as gasoline gum inhibitors and insoluble in dilute alkali solution which comprises establishing a liquid mixture of a phenol and a small amount of sulfuric acid, introducing into close contact therewith a stream of gas comprising said olefin in a gaseous state under conditions effective to prevent excessive mechanical condensation of said olefin, removing the reaction products and washing them with dilute alkali solution to remove products of less value as gum inhibitors.

2. In manufacturing gasoline gum inhibitors by causing a phenol to react with a normally liquid olefin in the presence of a small amount of concentrated sulfuric acid, the improvement which comprises establishing a mixture of said phenol and sulfuric acid, vaporizing said olefin and passing the resultant vapor into close contact with said mixture, under conditions effective to prevent mechanical condensation of the vapor to such extent as to precipitate the acid out of solution in the phenol.

3. In making concentrated phenol-olefin reaction products useful as gasoline gum inhibitors and insoluble in dilute alkali solution, the process of which comprises passing a stream of olefin-containing refinery gases into close contact with a mixture of about one hundred parts by weight of a phenol and between one and ten parts by weight of concentrated sulfuric acid, at a temperature between 60° and 250° F. effective to prevent excessive mechanical condensation of said olefin, washing the reaction product so formed with a dilute aqueous solution of alkali and recovering a purified product insoluble in dilute aqueous alkali solution.

4. The process of manufacturing phenol-olefin reaction products useful as gasoline gum inhibitors and insoluble in dilute alkali solution which comprises passing an olefin into close contact with a mixture of a phenol and sulfuric acid, regulating the rate of addition and temperature to prevent the accumulation of a substantial excess of liquid olefin over the amount required to encourage reaction of olefins with the phenol, and continuing said introduction of olefin until the liquid reaction product reaches a volume equal to from 30 to 250 per cent of the volume of the phenol as initially employed, washing the product with dilute alkali solution and discarding the alkali-soluble portions thereof.

5. The process of manufacturing concentrated phenol-olefin reaction products useful as gasoline gum inhibitors which comprises passing gaseous olefinic material into close contact with a mixture of a phenol and sulfuric acid under conditions effective to prevent excessive mechanical condensation of said olefin, washing the resultant product with caustic soda solution to remove alkali-soluble portions, and distilling the washed alkali-insoluble product to separate relatively low-boiling gasoline-like polymers therefrom.

TROY LEE CANTRELL.